(12) United States Patent
Hartmann

(10) Patent No.: US 10,119,574 B2
(45) Date of Patent: Nov. 6, 2018

(54) TORQUE-TRANSMITTING COUPLING

(71) Applicant: CENTA-ANTRIEBE KIRSCHEY GmbH, Bergische (DE)

(72) Inventor: Norbert Hartmann, Cologne (DE)

(73) Assignee: CENTA-ANTRIEBE KIRSCHEY GMBH, Haan (DE)

(*) Notice: Subject to any disclaimer, the term of this patent is extended or adjusted under 35 U.S.C. 154(b) by 0 days.

(21) Appl. No.: 14/871,328

(22) Filed: Sep. 30, 2015

(65) Prior Publication Data

US 2016/0138656 A1    May 19, 2016

(30) Foreign Application Priority Data

Nov. 14, 2014 (DE) .................. 10 2014 016 798

(51) Int. Cl.
| F16D 3/14 | (2006.01) |
| F16D 3/04 | (2006.01) |
| F16D 3/78 | (2006.01) |
| B29C 39/10 | (2006.01) |
| F16D 3/74 | (2006.01) |
| F16D 3/79 | (2006.01) |
| B29K 19/00 | (2006.01) |
| B29L 31/00 | (2006.01) |

(52) U.S. Cl.
CPC ............... *F16D 3/04* (2013.01); *B29C 39/10* (2013.01); *F16D 3/74* (2013.01); *F16D 3/78* (2013.01); *F16D 3/79* (2013.01); *B29K 2019/00* (2013.01); *B29L 2031/748* (2013.01)

(58) Field of Classification Search
CPC ................. F16D 3/04; F16D 3/74; F16D 3/78

USPC ............................. 464/92, 96, 102
See application file for complete search history.

(56) References Cited

U.S. PATENT DOCUMENTS

| 1,669,931 | A | * | 5/1928 | Dowrie | ..................... F16D 3/04 |
| | | | | | 464/102 |
| 2,742,769 | A | * | 4/1956 | Gleeson | ..................... F16D 3/74 |
| | | | | | 464/92 X |
| 3,800,557 | A | * | 4/1974 | Tobin | ......................... F16D 3/78 |
| 4,391,594 | A | * | 7/1983 | Hannibal | ............... F16D 3/725 |
| | | | | | 464/92 X |
| 4,563,166 | A | * | 1/1986 | Walter | ..................... F16D 3/74 |
| | | | | | 464/92 |
| 4,763,767 | A | * | 8/1988 | Lanzarini | ............. F16F 15/124 |
| | | | | | 464/92 X |

(Continued)

FOREIGN PATENT DOCUMENTS

GB          621419      *   4/1949

*Primary Examiner* — Greg Binda
(74) *Attorney, Agent, or Firm* — Andrew Wilford

(57) ABSTRACT

A device for transmitting torque on an axis from a drive to an output has a first connection for connecting with the drive and having a vulcanization surface, and a second connection for connecting with the output and also having a vulcanization surface. An elastic element formed of rubber-elastic material is in the power transmission path between the two connections, is constructed so as to be radially soft, permitting a radial offset of up to 1 mm between the first connection and the second connection, is torsionally rigid to permit an only very small torsion angle of at most 1.5° between the first connection and the second connection, and is vulcanized to the vulcanization surface of the first connection and to the vulcanization surface of the second connection.

16 Claims, 13 Drawing Sheets

(56) References Cited

U.S. PATENT DOCUMENTS 5,382,194 A * 1/1995 Scherner .................. F16D 3/00
  464/92 X
5,595,540 A * 1/1997 Rivin ........................ F16D 3/04
  464/102
9,163,673 B2 10/2015 Kastner et al.

* cited by examiner

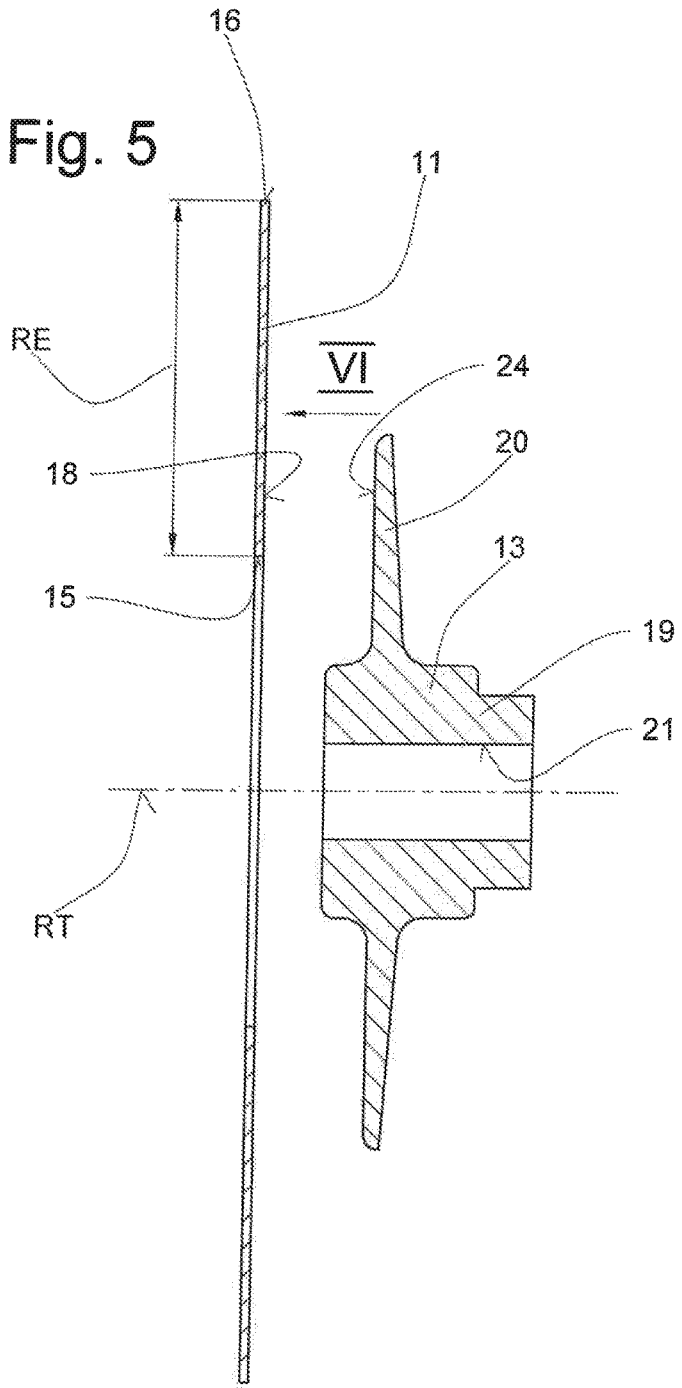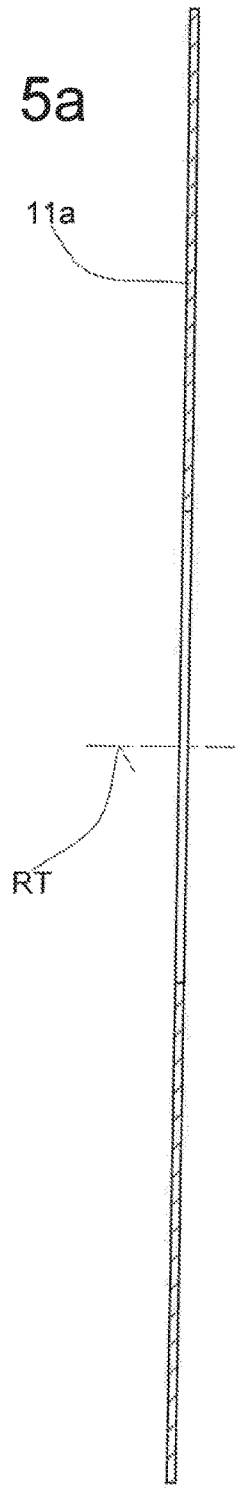

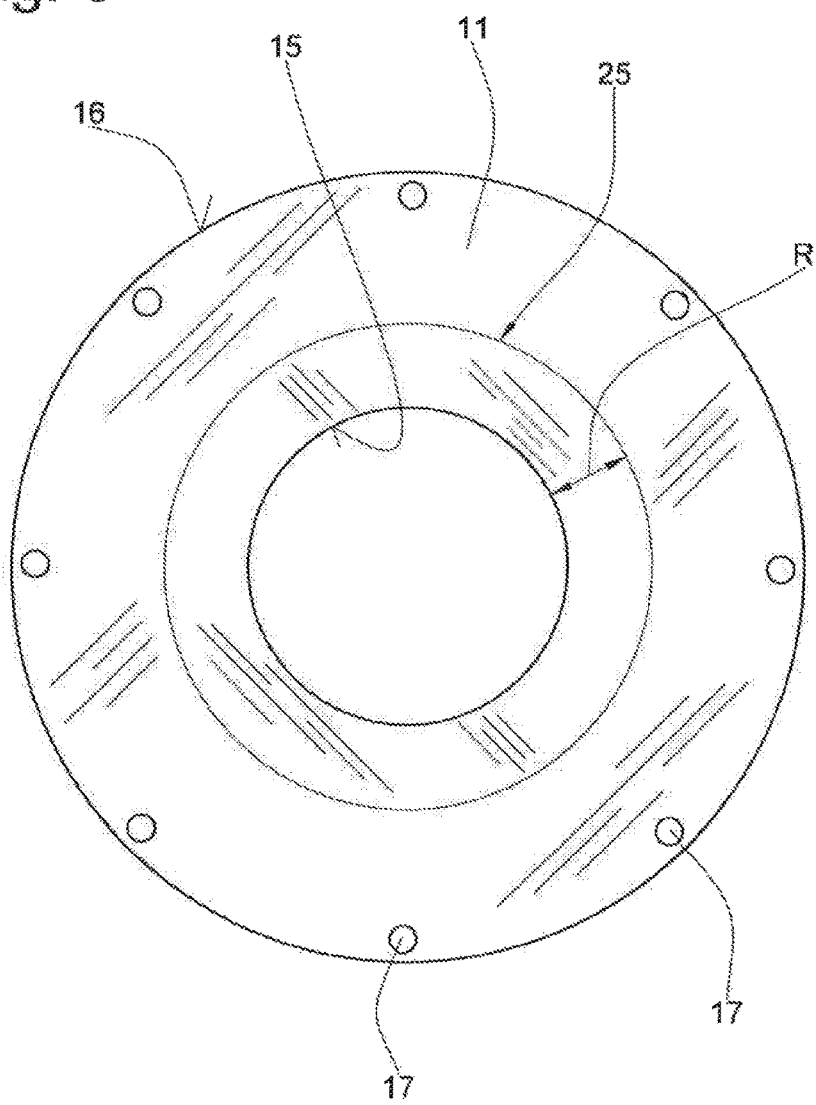

TORQUE-TRANSMITTING COUPLING

FIELD OF THE INVENTION

The invention relates first to a device for transmitting torque on an axis from a drive to an output, the device having a first connection, in particular a flange, for connecting with the drive, and a second connection, in particular a hub, for connecting with the output.

BACKGROUND OF THE INVENTION

Devices for transmitting torque from a drive and an output are commonly also designated as couplings. Couplings have been developed and marketed by the applicant for decades.

A differentiation is made between torsionally soft couplings and torsionally rigid (or torsion-rigid) couplings.

A coupling is designated as a torsionally soft (or elastic) coupling that as a result of a certain torsion permits a torsion angle between the first connection and the second connection in a range of typically for instance between 6° and 12° in the operating range that is to be expected, i.e. within the torques that are to be expected in a normal operation of the coupling. A torsionally soft coupling (also: so-called elastic coupling) has a resonance frequency that is selected so that it lies below the operating range (of the frequencies that are to be expected). Torsionally soft couplings in particular damp torque peaks at a particular frequency or in a particular frequency range, and protect for example the components (e.g. a gearing) arranged downstream of a drive (e.g. a diesel engine) from torsion non-uniformities.

Torsionally rigid couplings, by comparison, are couplings of an entirely different type. In a torsionally rigid coupling, a torsion angle between the first connection and the second connection is to be kept very small in the operating range of the coupling.

A torsionally rigid coupling is therefore an almost torsionally stiff coupling. Here, the resonance frequency is selected above, typically far above, the operating range of the coupling. Torsionally rigid couplings come into use in particular in cases of application where a torsion angle between the first connection and the second connection is not to be permitted, or is not necessary, in the typical operating range.

The invention relates to such rotationally rigid couplings of the last described type.

Within the scope of the present patent application, such couplings are regarded as torsionally rigid couplings that still permit a certain torsion angle between the first connection and the second connection of for example up to 0.5°, if applicable also up to 1.5°, in the typical operating range of the coupling, but prevent greater torsion angles.

Torsionally rigid couplings of the generic type are marketed by the applicant for example under the article designation CENTAFLEX-KE. Here, a flange element of a high-strength, glass-fibre-reinforced plastic is provided, which has an axially insertable hub radially on the inner side. The flange, in the shape of an annular disk, consists of plastic and is provided with reinforcing struts.

Radially externally on the ring flange, rubber bushes are provided, which permit a screw fastening of the coupling for example on the flywheel of a motor.

Owing to the rubber bushes, a radial offset in a very small extent up to 0.3 mm is able to be compensated.

A further torsionally rigid coupling of the generic type is marketed by the applicant under the designation CENTAFLEX-K. Here, a membrane-like, thin ring flange is provided, which likewise consists of a glass-fibre-reinforced plastic. In the region of the hub, an axial plug connection with a shaft is possible. The metal hub can be inserted with its radially outwardly projecting teeth into corresponding recesses of the coupling hub.

OBJECT OF THE INVENTION

Proceeding from the described generic torsionally rigid couplings as described above, the invention is based on the problem of creating a coupling constructed so as to be torsionally rigid, but that can compensate a radial offset to a greater extent than is known in the prior art.

SUMMARY OF THE INVENTION

The invention solves this problem first in that in the power transmission path between the two connections an elastic element is arranged, which is constructed so as to be radially soft, permitting a radial offset between the first connection and the second connection, and so as to be torsionally rigid, permitting an only very small torsion angle between the first connection and the second connection.

According to the invention, a device is proposed for transmitting torque from a drive to an output. The drive can be, for example, the flywheel of a motor, for example a hydrostatic drive of a construction machine. The output can be provided by a shaft that leads to a gearing, in particular to a transfer gearbox.

The device comprises a first connection for connecting with the drive and a second connection for connecting with the output. The first connection can be provided in particular by a ring-shaped flange. The latter can preferably consist of metal or of a hard plastic. It can have a plurality of fastening bores arranged radially externally, distributed on the circumference, by means of which the flange—with the avoidance of play—or loose areas—, and without the intercalation of elastic elements, can be fastened directly on the flywheel of the motor.

A second connection can be formed by a hub that consists of plastic. The hub can have an inner hub part, which consists of a high-strength plastic or of metal. This inner hub part can be injected around with formation of the hub.

The hub part can have inner teeth or can be introduced afterwards by means of a broaching tool.

The inner teeth serve for an axial plug connection of the hub with a shaft.

The device is secured e.g. first on the flywheel of the motor via the first connection, and then through the axial plug connection a connection is undertaken with the shaft. The assembly sequence can, however, also be made in reverse.

Devices of the generic type are commonly designated as couplings, so that the term "coupling" is used in the following synonymously to the term "device" as described above.

According to the invention, an elastic element is arranged in the power transmission path between the two connections. The principle of the invention therefore makes provision that the coupling has a first connection and a second connection, which are formed by separate, structurally initially separated elements. The elements are connected with one another by an elastic element, preferably of a rubber-elastic material. Here, preferably rubber-elastic materials come into consideration, which in the hardened state have a Shore hardness in the range of 80+/−10.

The elastic element is vulcanized both onto the first connection and also onto the second connection. Practically, in an embodiment, provision is made that the ring flange has surfaces for the vulcanizing of the elastic element, and the hub has counter-surfaces arranged lying radially opposite, which likewise serve for the vulcanizing of the elastic element. These surfaces are also designated in the following as vulcanization surfaces.

According to a particular embodiment of the invention, the vulcanization surfaces are arranged parallel to one another or substantially parallel to one another, and run along a radial plane, i.e. along a plane, the normal vector of which is provided by the rotation axis of the device.

The characteristic of the invention consists in that the elastic element is constructed so as to be radially soft, but torsionally rigid. This means that owing to the selected geometry, i.e. the spatial form of the elastic element, and owing to its axial extent, and its radial extent, the element permits a certain radial offset between the first connection and the second connection, permits a torsion angle between the first connection and the second connection in an only very small angle range of a maximum 0.5 degrees, but prevents greater torsion angles. In this connection, it is additionally noted that devices are also included by the invention that can also permit a maximum torsion angle between the first connection and the second connection of at most 1.5 degrees.

These details apply for the operating ranges of the couplings that are to be expected, i.e. for the torques and torque differences or respectively torque non-uniformities that are typically to be expected.

According to the invention, for example, a radial offset of up to 1 mm can be compensated. The tolerances that are to be expected owing to assembly- or manufacturing tolerances on the drive, or respectively on the output in radial deviation can preferably be taken up and compensated in a range between 0.5 mm up to 1 mm. Here, the radial compensation according to the invention is possible in a wear-free manner, because the radial compensation is taken up completely within the elastic element.

The invention recognizes that also in the case of couplings that are constructed so as to be torsionally rigid—per se at first sight technically counter to, and departing from, the teaching of the prior art—elastic elements can be used with a suitable choice of the geometry, in order to be able to compensate a radial offset. This takes place according to an advantageous configuration in that in axial direction the elastic element is constructed so as to be very short, for example only 2 mm or 4 mm wide, and in radial direction has a much greater extent by comparison, of for example 20 mm or 40 mm.

The radial extent of the elastic element here is a multiple, preferably 10 to 100 times the axial extent of the elastic element. The elastic element itself can in particular be constructed in the form of a circular ring disk or substantially in the form of a circular ring disk. It can be constructed continuously in circumferential direction, or can have interruptions. In an embodiment of the invention, the elastic element can be constructed in the manner of circular ring disk. It can also have recesses, in particular radially outwardly arranged recesses for the passage of fastening elements, such as screws.

The invention solves the previously described problem according to a further aspect in that in the power transmission path between the two connections an elastic element is arranged, which is constructed in the manner of a rubber track and has a radial extent that is more than twice as great as its axial extent.

To avoid repetitions, reference is to be made to the previous comments and definitions of features, which are used in an analogous manner for the description of the invention.

According to an advantageous configuration of the invention, the elastic element consists of a rubber-elastic material. In particular, known rubber-elastic materials are used, which are able to be vulcanized and have a Shore hardness in the range of 80+/−10.

According to a further advantageous configuration of the invention, the first connection is provided by a ring flange, which in particular has a plurality of fastening bores arranged distributed over the circumference. Hereby a fastening, which is particularly simple, free from play and avoiding loose surfaces, of the first connection to the drive can be undertaken—without intercalation of elastic elements. Here, at the same time, a very small axial overall height of the coupling can be achieved in the installed state.

According to a further advantageous configuration of the invention, the ring flange consists of metal or of a high-strength plastic. This makes possible a recourse to known materials, and the construction of a highly torsionally rigid coupling.

According to a further advantageous configuration of the invention, the second connection is formed by a hub that comprises a hub part of high-strength plastic or of metal. According to this embodiment, the central hub part, which can also be designated as the hub core, has inner teeth. This inner hub part can be injected around as a component of the hub. Here, one also speaks in terms of the hub part being injected onto the hub. In an embodiment, the hub itself has, in addition to the central, high-strength core, a radially outwardly projecting ring flange. The ring flange provides a vulcanization surface on the hub, which lies opposite a corresponding vulcanization surface on the first connection. This pair of surfaces can be aligned parallel to one another.

According to an advantageous configuration of the invention, the elastic element is vulcanized onto the first connection and is also vulcanized onto the second connection. This enables a particularly simple production of the coupling according to the invention.

According to a further advantageous configuration of the invention, the vulcanization surfaces on the first connection and on the second connection are aligned substantially along a radial plane, in particular aligned parallel to one another or substantially parallel to one another. This enables the construction of a torsionally stiff or highly torsionally rigid coupling.

In the non-generic torsionally soft couplings of the prior art, elastic elements are indeed regularly used. Here, however, it is to be observed on the one hand that the axial extent thereof lies for instance in the order of their radial extent. On the other hand, in torsionally soft couplings of the prior art, it is usual that the vulcanization surfaces for the elastic elements are not aligned parallel to one another, but rather, on observation of a cross-section containing the rotation axis of the device, widen radially outwards, in order to receive the shearing forces.

According to a further advantageous configuration of the invention, the elastic element is constructed substantially in the form of a circular ring disk. This makes possible a particularly simple production of a coupling according to the invention and the provision and simple and precise prior determining of the desired characteristics of the coupling in the sense of a radial softness and a torsional rigidity.

According to a further advantageous configuration of the invention, the elastic element is constructed continuously in circumferential direction, or is constructed substantially continuously. This offers a possibility for simple production.

According to a further configuration of the invention, the elastic element, deviating from a configuration in the form of a circular ring disk, is equipped with recesses. The recesses can comprise in particular recesses arranged on the edge side (i.e. lying radially externally), in order to be able to provide passages for screws.

According to an alternative configuration of the invention, the elastic element is constructed so as to be interrupted in circumferential direction. It becomes clear here that for the provision of the desired radial softness but torsional rigidity of the coupling or respectively of the elastic element, a continuous circular ring disk shape is not absolutely necessary.

The same effect, from a technical point of view, can also be achieved with a plurality of surfaces, spaced apart in island form, in the manner of a spot pattern. The production is, certainly, then more laborious in certain circumstances than if a substantially continuously constructed elastic element in the form of a circular ring disk is provided in the manner of a rubber track.

Such a spot pattern or a plurality of such islands can, however, as a whole reproduce a circular disk ring shape or approximate to one, in order to achieve the same physical effect.

According to a further advantageous configuration of the invention, the elastic element, on observing a cross-section containing a rotation axis of the device, has a radial extent and an axial extent. Provision is made here that the radial extent of the elastic element is more than twice as great as the axial extent of the elastic element. This geometry ensures a construction of a torsionally stiff, but radially soft coupling. The cross-section of the elastic element, with this approximated observation, is formed substantially by a rectangle.

The terms "radial extent of the elastic element" and "axial extent of the elastic element" refer here to those material sections of the elastic element that are arranged directly between the pair of vulcanization surfaces that are lying opposite one another. The material sections of the elastic element that engage over or around radially internal ring face regions of a ring flange or radially outwardly situated sections of a radial hub flange, are disregarded in this simplified and approximated observation. Certainly, such embodiments are also included by the invention in which the elastic element has the previously mentioned material sections or regions.

According to a further advantageous configuration of the invention, the ratio of the radial extent to the axial extent behaves as a value in a range between 5:1 and 100:1. In particular, the ratio of the radial extent to the axial extent behaves as a value in a range between 5:1 and 50:1.

Further in particular, the ratio of the radial extent to the axial extent behaves as a value in a range between 5:1 and 20:1.

According to an advantageous configuration of the invention, the elastic element has a substantially rectangular cross-section. The side lengths of the rectangle are formed by the axial extent and the radial extent.

According to a further advantageous configuration of the invention, the fastening of the first connection on the drive and/or the fastening of the second connection on the output takes place in a play-free manner, without the arrangement of loose surfaces, and without the intercalation of elastic elements. Hereby, it can be ensured that with the occurrence of a radial offset between drive and output in a range of up to 1 mm a take-up of tolerance takes place through the elastic element, without loose surfaces rubbing against one another and a wear occurring. The device according to the invention is able to be operated in a wear-free manner in the indicated radial tolerance compensation range.

According to a further aspect, the invention relates to a modular system for torsionally rigid couplings, permitting radial offset.

The invention is based on the problem of indicating a modular system by which couplings with differently dimensioned ring flanges can be produced in a simple manner for the purpose of mounting on different flywheels of motors.

The invention solves this problem with a modular system.

The principle of the invention consists substantially in that a first coupling and a second coupling are provided, wherein the first coupling has a ring flange with dimensions of a first type, and the second coupling has a ring flange with dimensions of a second type, differing from the dimensions of the first type. The two ring flanges can, for example, have different external diameters, but identical internal diameters.

Provision is further made that the two devices have substantially identically dimensioned hubs.

Thereby, a manufacture of couplings—according to the requirement of the dimensioning of the ring flange—can be carried out with identical hubs or hub parts and with different ring flanges. Such a coupling manufacture can take place in the same tool. The outlay with regard to stock is considerably reduced.

It is now only still necessary to stock one hub and two different ring flanges. According to requirements, these can then be connected with one another by vulcanization in the same tool with intercalation of the elastic element.

The modular system according to the invention makes provision here that despite differently dimensioned ring flanges, geometrically identically constructed vulcanization surfaces of the different ring flanges can be provided, so that on inserting of differently dimensioned ring flanges into the same tool always a same, identical or at least similar receiving space, in the shape of a circular ring disk, can be provided in the tool.

Finally, the invention relates to a method that comprises the following steps:

According to step a), a hub is inserted into a tool.

According to step b), a ring flange is inserted into a tool.

The hub is provided by a component that is suitable for use in a coupling according to the invention, i.e. for the purpose of fastening on a drive.

The ring flange constitutes a connection for fastening on the drive. For example, the ring flange can be constructed in the form of a circular ring disk.

The method according to the invention furthermore comprises the step of providing a receiving space, substantially in the form of a circular ring disk, for receiving a fluid, rubber-elastic material. The receiving space, in the form of a circular ring disk, is situated, in the state of hub and ring flange when inserted into the tool, between these two elements and spaces the two elements apart from one another. The receiving space has here a radial extent and an axial extent. The designations "radial extent" and "axial extent" refer to the rotation axis of the completed coupling.

The distinctive characteristic consists in that the radial extent of the receiving space behaves to its axial extent as a value in a range between 3:1 and 100:1, in particular as a value in a range between 5:1 and 50:1.

According to the method in accordance with the invention, furthermore the step takes place of introducing a rubber-elastic material into the receiving space. The material is then allowed to harden, with vulcanization of the material on those boundary surfaces that are provided by the hub and by the ring flange. Finally, the receptacle can be opened and the coupling unit can be removed from the tool.

The method according to the invention revolutionizes the production of a torsionally rigid coupling. By the method according to the invention, it is possible to connect ring flanges of differing size with identical hubs in one and the same tool. This considerably simplifies the production of a torsionally rigid coupling, permitting a radial offset.

BRIEF DESCRIPTION OF THE DRAWING

Further advantages of the invention will emerge from the non-cited subclaims, and with the aid of the following description of the embodiments illustrated in the drawings. In the drawings there are shown:

SPECIFIC DESCRIPTION OF THE INVENTION

Figure 1:
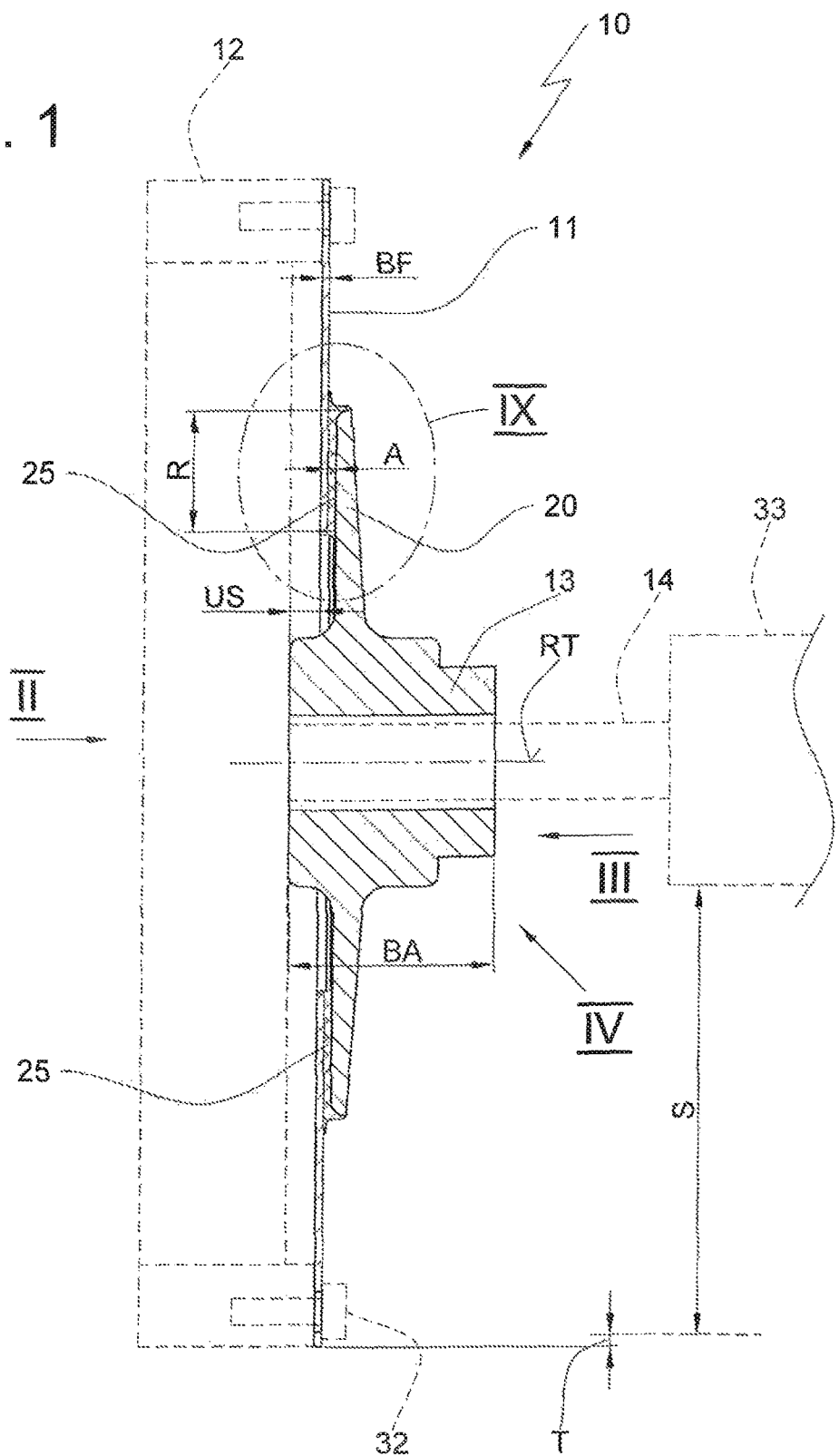
FIG. 1 in a diagrammatic view, partially in section, a first embodiment of a device according to the invention and, illustrated in dashed lines, a flywheel of a motor, screw fastening elements for securing the ring flange on the flywheel and, again illustrated in dashed lines, a shaft connected to the hub and a gearing, illustrated in a discontinued manner in dashed lines, FIG. 2 the embodiment of the device according to FIG. 1, approximately according to view arrow II in FIG. 1, in a simplified schematic diagram, FIG. 3 the device of FIG. 1 in a rear view, approximately according to view arrow III in FIG. 1 in a simplified, diagrammatic illustration, FIG. 4 in a diagrammatic perspective view, the device of FIG. 1 approximately along view arrow IV in FIG. 1, FIG. 5 the embodiment of FIG. 1, illustrated extended apart before assembly, FIG. 5a in isolated illustration, an altered ring flange with altered dimensions compared with FIG. 5, FIG. 6 in a simplified schematic diagram, the ring flange of FIG. 5 in isolated illustration, approximately according to view arrow VI in FIG. 5, with additionally illustrated elastic element, FIG. 7 a further embodiment to illustrate an altered geometry of the elastic element in an illustration according to FIG. 6, FIG. 8 a further embodiment of a device according to the invention to illustrate an altered elastic element in an illustration according to FIG. 6, FIG. 9 in a diagrammatic enlarged cut-out illustration, a connecting region of the device of FIG. 1 between ring flange and hub flange, to illustrate the geometry of the elastic element, greatly enlarged, approximately according to reference circle IX in FIG. 1, FIG. 10 a further embodiment of a device according to the invention in an illustration according to FIG. 1 with an altered geometry, compared with the embodiment of FIG. 1, of the cross-section of the elastic element and with an altered hub part, FIG. 11 a further embodiment of a device according to the invention in an illustration according to FIG. 10 with an again altered hub part, FIG. 12 the embodiment of FIG. 11 in a view illustration according to view arrow XII in FIG. 11, and FIG. 13 the embodiment of FIG. 11 in a diagrammatic perspective view, approximately along view arrow XIII in FIG. 11.
Figure 2:
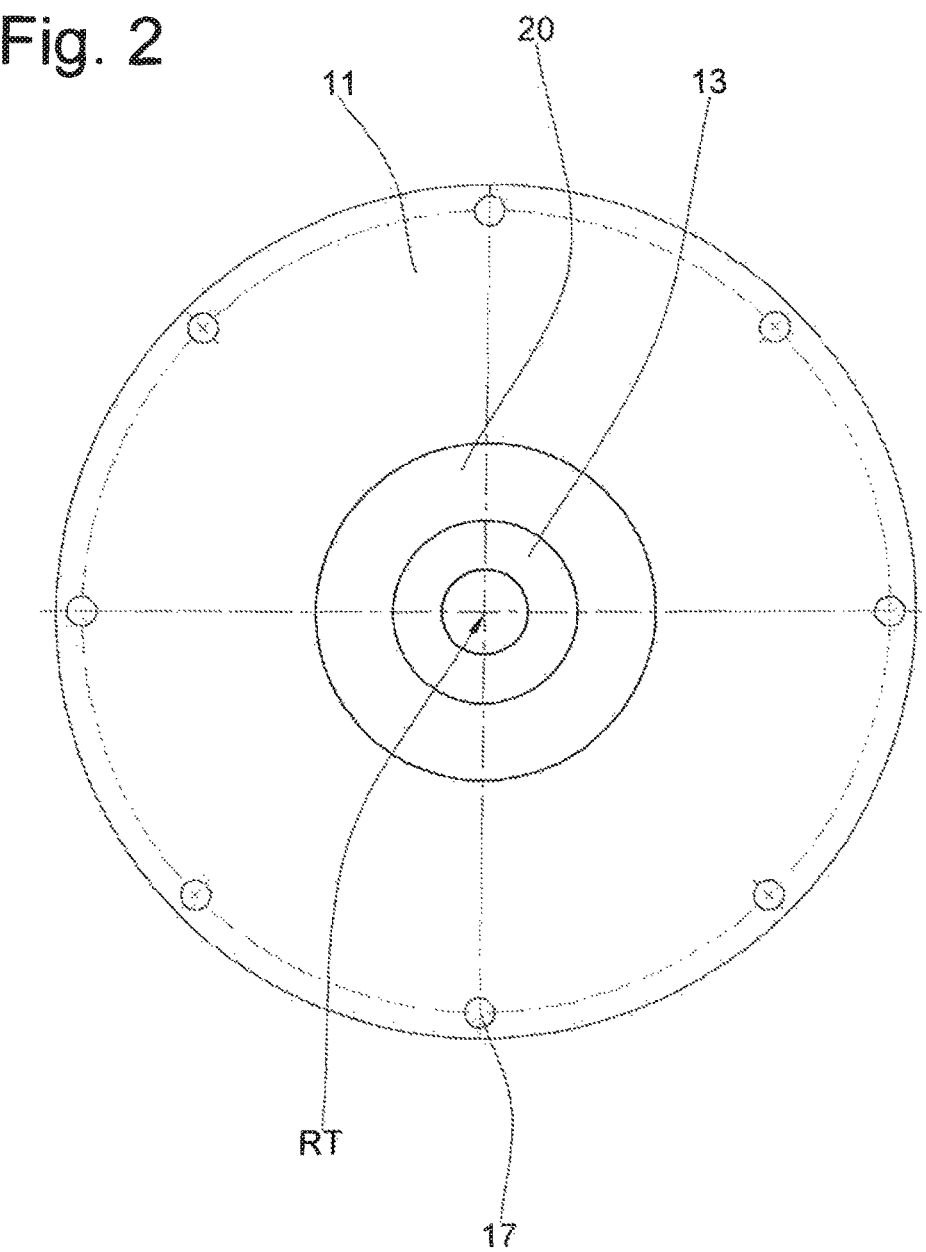
Figure 3:
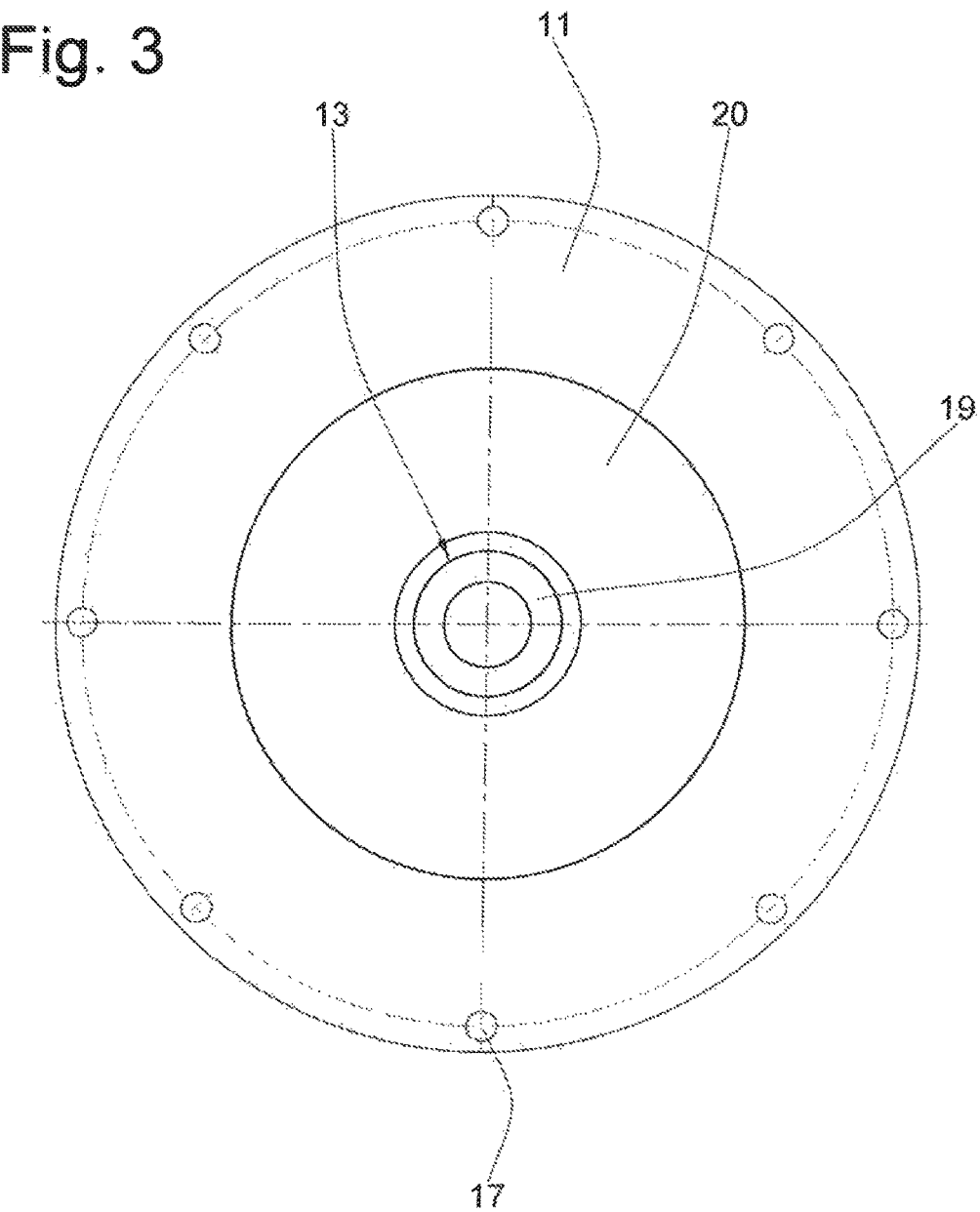
Figure 4:
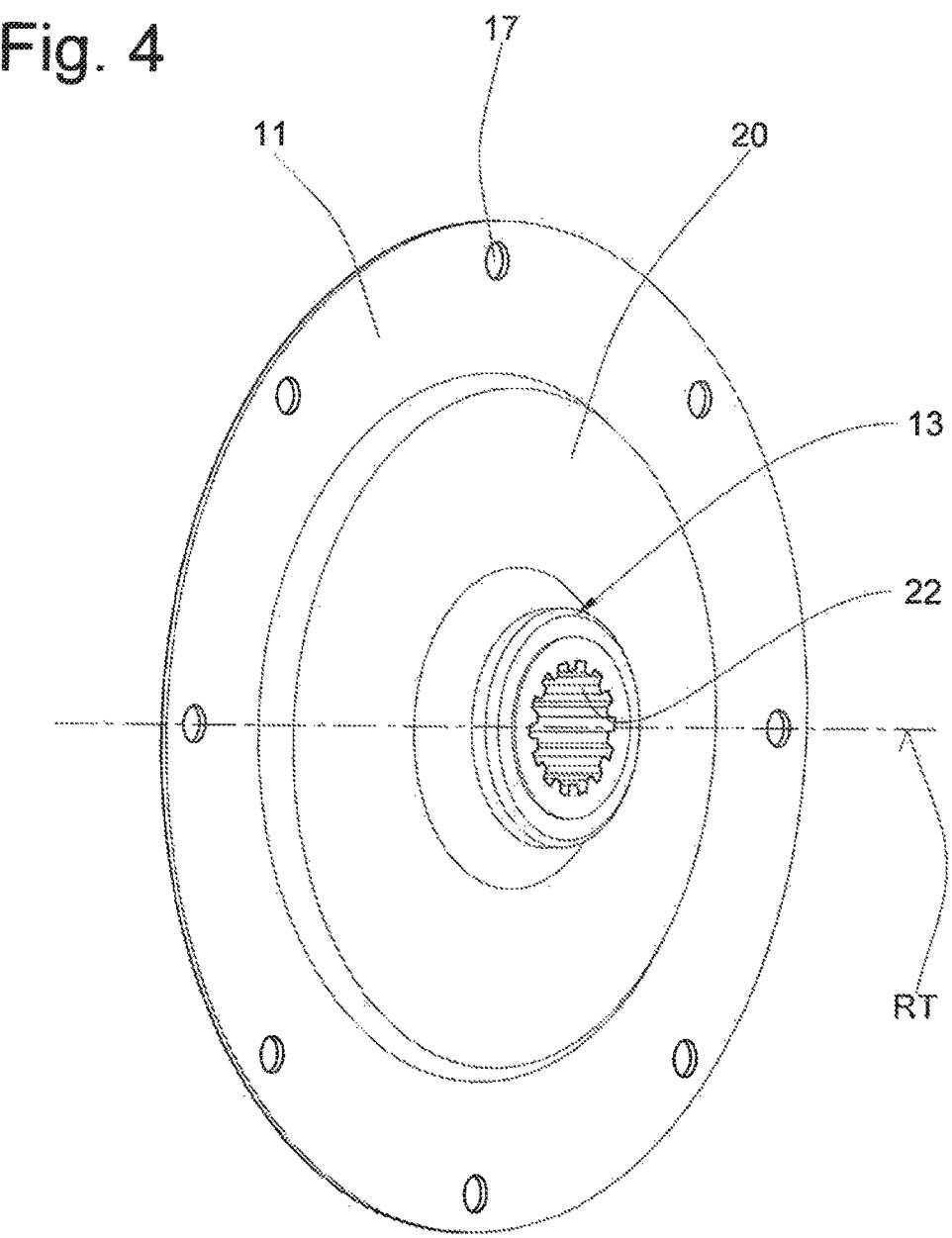

Embodiments of the invention are described by way of example in the following description of the figures, also with reference to the drawings. Here, for the sake of clarity—also in so far as different embodiments are concerned—identical or comparable parts or elements or regions are designated by the same reference numbers, partially with the addition of small letters.

Features that are only described with reference to one embodiment can also be provided within the scope of the invention in each other embodiment of the invention. embodiments that are altered in such a way are included by the invention—even if they are not illustrated in the drawings.

All disclosed features are individually essential to the invention. Herewith also the disclosure content of the associated priority documents (copy of the prior application) and of the cited publications of the prior art are also included in full into the disclosure of the application, also for the purpose of including individual or several features of these documents into one or into several claims of the present application.

FIG. 1 shows a first embodiment of a device according to the invention and is designated there in its entirety by reference number 10.

The device comprises a first connection 11, which is constructed as a ring flange in the embodiment. The ring flange can consist of metal or of a high-strength plastic.

With reference in particular to FIGS. 5 and 6, it becomes clear that the ring-shaped flange 11 has an inner circumferential surface 15 and an outer circumferential surface 16.

The radial extent of the ring flange 11 is designated by the reference RE.

In addition, it can be seen that radially externally, arranged distributed over the circumference, a plurality of fastening bores 17 are provided. In the embodiment, as can be seen from FIG. 6, eight fastening bores 17 are provided, with the number of bores, of course, being placed at the discretion of the specialist in the art.

The ring flange 11 has an axial extent that is designated by BF (FIG. 1).

FIG. 1 indicates—only very diagrammatically, and in dashed lines—a flywheel 12 of a motor, on which the ring flange 11 can be fastened directly by means of indicated screws 32—without the intercalation of elastic elements. The flywheel 12 constitutes the drive of the device.

The device 10, which is designated synonymously also as a coupling within the scope of this patent application, serves for transmitting torque from the drive 12 to an output 14.

The output 14 is a shaft 14, illustrated only diagrammatically in FIG. 1, in a discontinued manner and in dashed lines, which can be connected with a gearing 33 that is illustrated in an indicated manner.

For connection with the shaft 14, the device 10 has a second connection 13 in the form of a hub. The hub 13 can as indicated by the embodiment of FIG. 1—be constructed for example in one piece. However, as is further explained later with the aid of the embodiments of FIGS. 10 and 11—it can also consist of several parts.

The hub 13 has, viewed as a whole, a hub center 19, i.e. a part 19 that is shaped so as to substantially convex, arranged radially internally or centrally, and a hub flange 20, which projects radially outwards.

Figure 9:
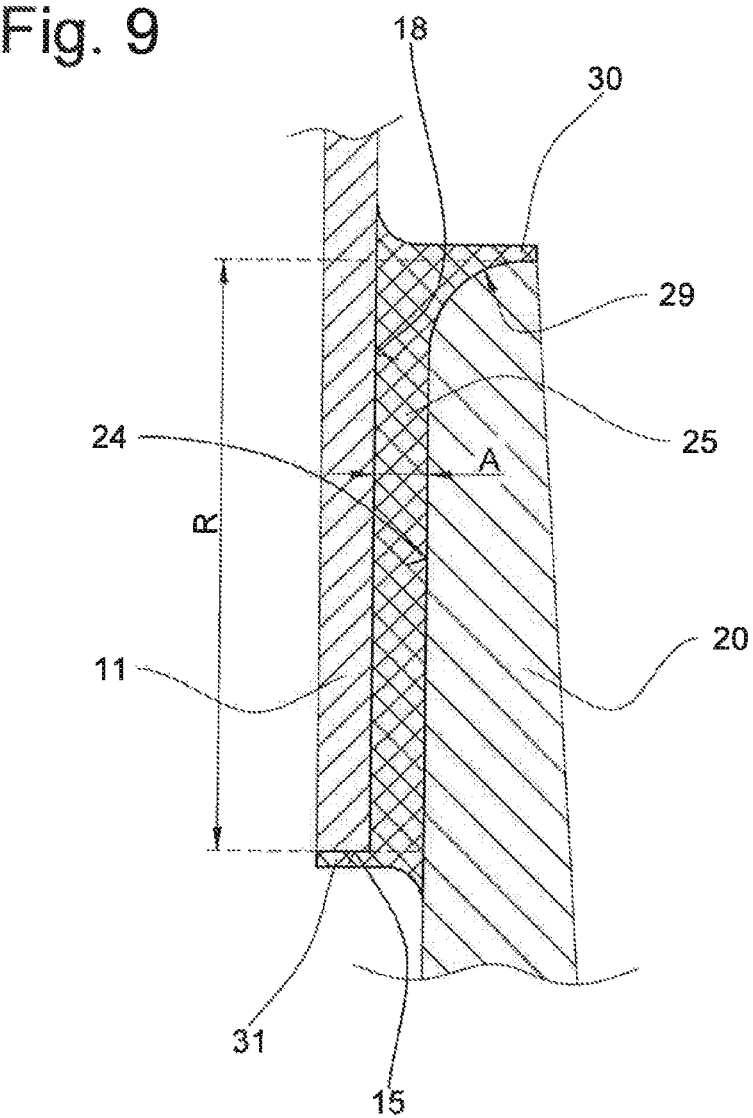

Both on the ring flange 11, and also on the hub flange 20 of the hub 13, vulcanization surfaces 18, 24 are situated, which can be seen for example in FIG. 9. The vulcanization surface 18 and also the vulcanization surface 24 are arranged respectively along a radial plane. The two surfaces 18, 24 are aligned substantially parallel to one another. The term "radial plane" means that the plane through a normal vector is designated, which is aligned parallel to the rotation axis RT of the device.

The vulcanization surfaces 18, 24 serve for fastening an elastic element 25. The latter is constructed in the manner of a rubber track and has a spatial form shaped substantially as a circular ring disk.

As can be seen in particular on viewing FIGS. 1 and 9, the elastic element 25 is equipped with a substantially rectangular cross-section. The cross-section is formed by a rectangle of the side lengths A and R, wherein A designates the axial extent of the elastic element and R designates the radial extent of the elastic element 25.

In the embodiments of FIGS. 1 to 6, 9 and 10, the elastic element 25 is formed by a substantially continuous, i.e. encircling in circumferential direction, substantially constant cross-section. Its geometry is in this respect almost ideally approximated to a circular ring disk shape.

Figure 7:
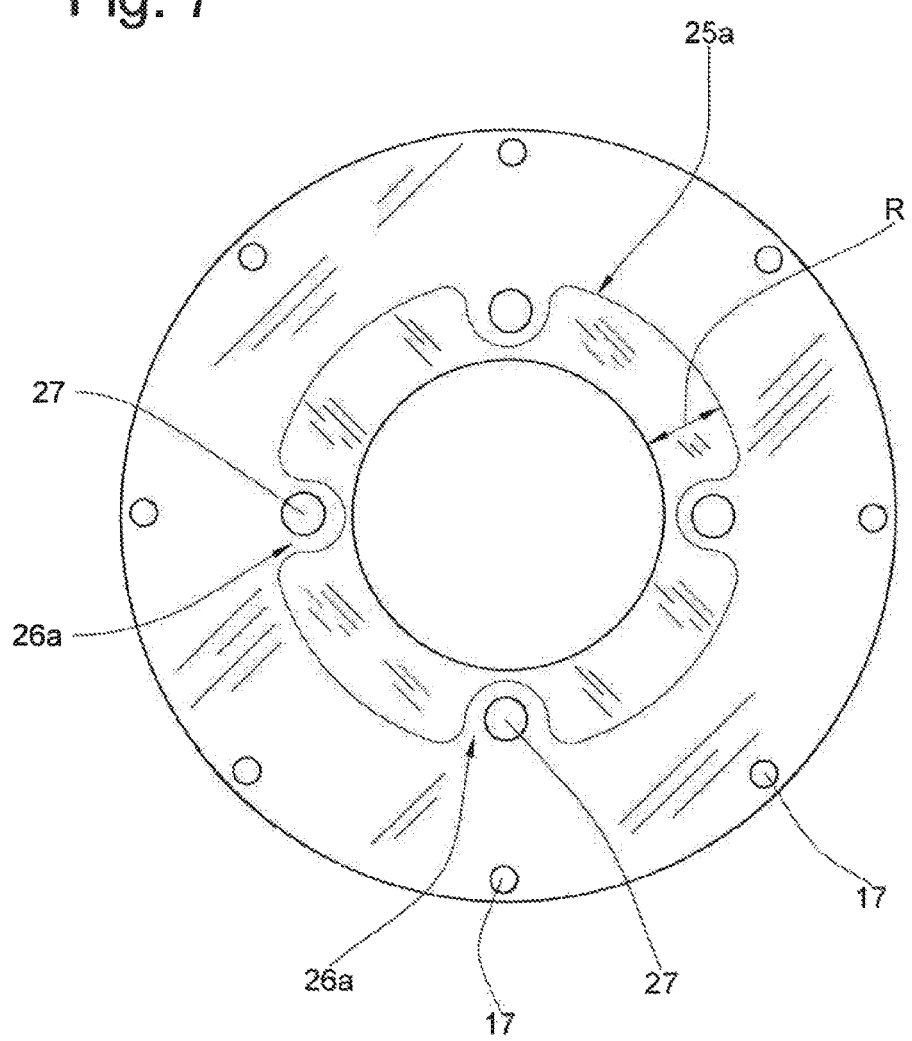

In the embodiment of FIG. 7, the elastic element 25 is likewise constructed continuously with the provision of a circular ring disk shape in circumferential direction, but has marginal recesses 26 for the provision of further fastening bores 27.

Figure 8:
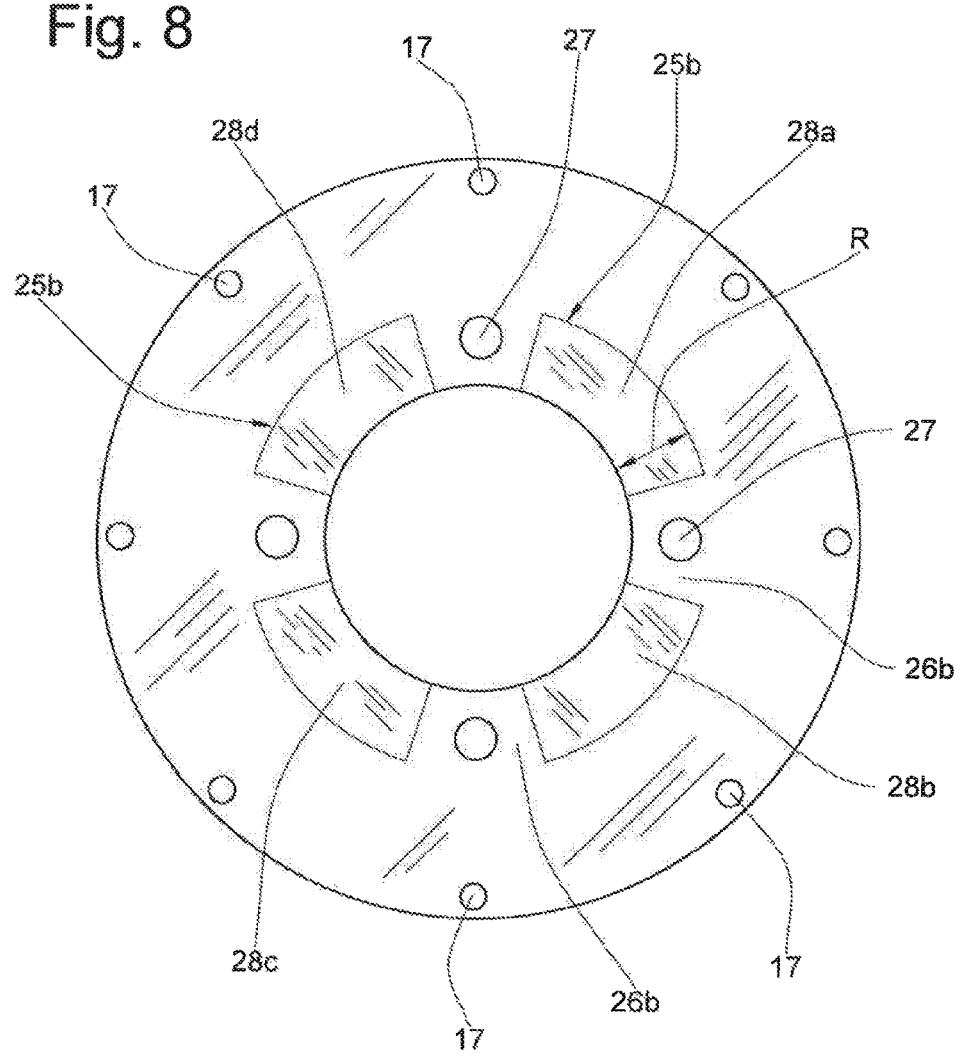

In the embodiment of FIG. 8, the elastic element 25 is formed of several segments 28a, 28b, 28c, 28d, and in this respect is interrupted, in relation to the circumferential direction. Here, also, the elastic element 25 in the sense of the invention is still constructed substantially in the shape of a circular ring disk.

The coupling 10 according to FIG. 1 enables a transmission of torques from the drive 12 to the output 14, wherein greater torsion angles than 0.5 degrees are prevented in the operating range of the coupling that is to be expected. The coupling 10 of FIG. 1 is in this respect constructed so as to be torsion-rigid or torsionally rigid.

In the case of the occurring torques or torque differences to be expected typically in the working operation of the coupling 10, torsion angles between the drive 12 and the shaft 14, and therefore circumferential angular offsets between the ring flange 11 and the hub 13 of approximately 0.5° are to be guaranteed.

The elastic element 25, which is equipped with an only very short axial extent A, provides for this. The elastic element 25 is therefore constructed so as to be so thin in axial direction that it is almost non-elastic in circumferential direction. The two vulcanization surfaces 18, 24 are connected with one another by the elastic element 25, kept thin in axial direction, therefore in a torsionally rigid manner in circumferential direction.

Owing to manufacturing- and assembly tolerances, a radial offset between drive 12 and shaft 14 (or respectively the element of the drive train, e.g. a gearing 33, in particular a transfer gearbox, arranged downstream of the shaft 14 in the power transmission path) can occur.

FIG. 1 indicates a desired distance S between flywheel 12 and gearing 33. Likewise, this desired distance S could also be measured between flywheel 12 and gearing 14. Professionally, one would furthermore always relate such a desired distance to the desired rotation axes of flywheel 12 and gearing 33, or respectively shaft 14.

This desired distance can be deviated from along a tolerance range T in radial direction. This is connected for example to the fact that owing to the trend, which is to be observed nowadays in the especial field of application of the coupling according to the invention, for the lightweight construction of hydrostatic drives and transfer gearboxes arranged downstream, greater manufacturing- and assembly tolerances, if applicable also tolerances due to operation, can occur.

In order to compensate this radial offset, which is designated as tolerance T in FIG. 1, a great radial extent of the elastic element 25—in relation to its very short axial extent—is provided according to the invention.

According to the invention, a radial tolerance compensation is now possible in a manner free from wear, because the radial offsets during operation of the coupling lead to a deformation work exclusively within the elastic element 25.

In the especial field of application of the coupling according to the invention, a tolerance compensation up to maximum tolerances of 0.5 mm to 1 mm can be achieved. This lies considerably above the possible tolerance compensation in couplings of the prior art.

In the embodiment of FIG. 1, the first connection 11 can be connected rigidly with the drive 12, wherein here an intercalation of elastic elements can be dispensed with entirely and in particular also loose surfaces can be avoided.

The hub 13 can also be connected securely with the shaft 14 without intercalation of elastic elements and without the provision of loose surfaces.

For this, the hub 13 can be equipped on the inner side with inner teeth 22. The inner teeth 22 can cooperate with outer teeth, not illustrated, on the shaft 14. The shaft 14 and hub 13 are inserted axially into one another and are then secured to one another with the provision of a rotary fit and with the avoidance of loose surfaces.

Figure 10:
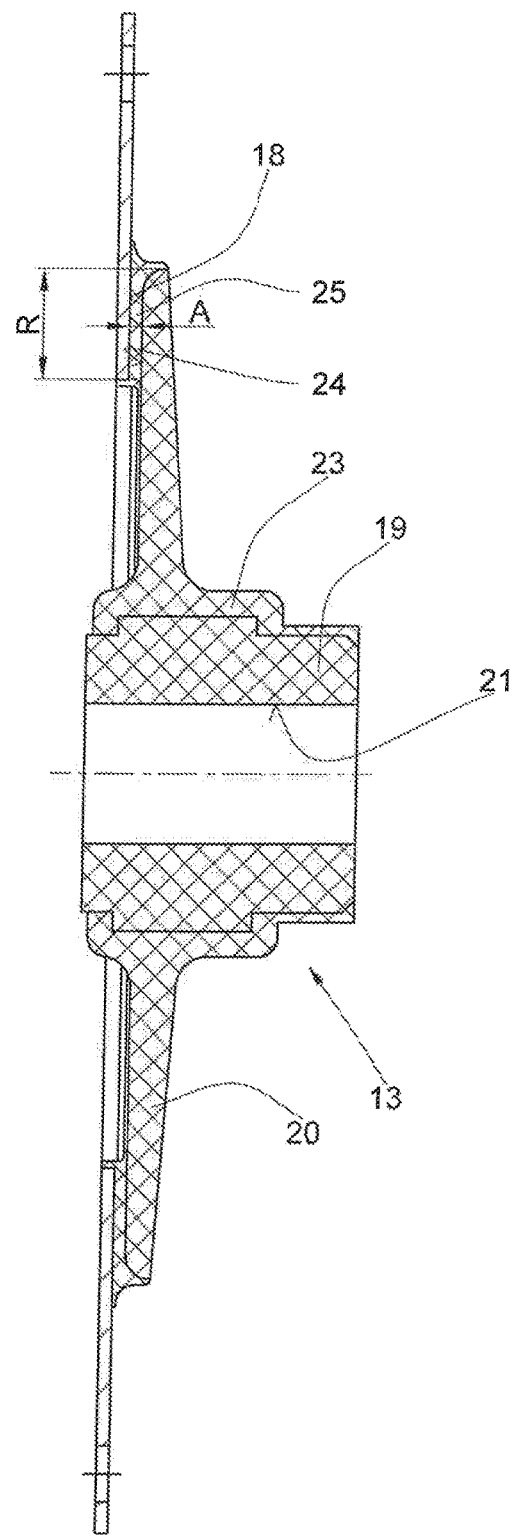

At this point it is noted that—as can be seen in particular from the illustration of FIG. 10—in variants of the invention the hub center 19, i.e. the radially inner part of the hub 13, is made from a separate workpiece, in particular of metal or of a high-strength plastic. The hub 13 is then formed in that the hub center 19 is injected by a plastic, in particular by a softer, more economically priced plastic with the formation of the hub flange 20 and of an injection covering 23, which surrounds the hub center 19.

Of course, other forms of production are also included by the invention.

The inner circumferential surface 21 of the hub center 19 can be provided with teeth 22 during the production of the separate workpiece 19. Alternatively, the teeth can be machined into the workpiece only after production of the hub center 19 by the processing of a broaching tool.

The invention enables a provision of a coupling that is torsionally rigid but compensates radial offset, with a very short axial overall structural height BA (cf. FIG. 1). Here, the embodiment of FIG. 1 shows an embodiment in which a projection US of the hub 13 with respect to the contour of the first connection 11, in relation to FIG. 1, is provided towards the left, i.e. towards the drive 12. Such a projection US can also be dispensed with in other embodiments, or—depending on the application situation—can also be enlarged, e.g. in order to reduce the projection provided on the opposite side in the embodiment of FIG. 1.

The enlarged cutout illustration of FIG. 9 makes clear that the radially outermost regions of the hub flange 20 can be equipped with curvature regions 29. These face regions of the hub flange 20 can also be overlapped or partially overlapped by the rubber-elastic material 25, wherein these overlap regions are designated by 30.

Also, the inner regions of the ring flange 11 can, as illustrated by FIG. 9, be overlapped radially on the inner side by sections of the rubber-elastic material 25, and form overlap regions 31. Hereby, the manufacture of the coupling according to the invention can be facilitated.

However, the overlap regions 30, 31 in this embodiment—as concerns their influence on the configuration of the radially soft, but torsionally rigid construction of the coupling as a whole—are to be disregarded.

The elasticity characteristics, required according to the invention, of the elastic element 25 in the sense of the achieving of a torsionally rigid but radially soft coupling are provided substantially by the cross-section of the substantially rectangular rubber element 25, wherein here the ratio of its radial extent to its axial extent is definitive.

FIG. 9 also makes clear that the flux of force from the first connection 11 (ring flange) to the second connection 13 (hub) takes place exclusively through the rubber-elastic element 25.

Finally, FIG. 9 also makes clear to a particular extent that the vulcanization surfaces 18, 24 are arranged substantially parallel to one another.

The overlap regions 30, 31 are also inconsequential here in this respect and can be taken out of consideration.

Finally, FIG. 9 makes clear that the flux of force from the first connection 11 to the second connection 13 takes place exclusively in axial direction.

In this context, it is noted that embodiments are also included by the invention in which a flux of force between the first connection 11 and the second connection 13 takes place substantially in radial direction. In this embodiment, the vulcanization surfaces are preferably formed along surface shells of a circular cylinder. Such embodiments have, however, a very much greater axial overall height and are of interest e.g. for such requirements in which very small radial overall heights of couplings are desired, but the concern is not with the axial overall height of the coupling.

In the embodiment of FIG. 10 it becomes clear that the ratio between radial extent and axial extent of the elastic element 25 has been altered compared with the embodiment of FIG. 1. This embodiment has a ratio of radial extent to axial extent that lies approximately in a region of 8:1, whereas this value in the embodiment of FIG. 1 lies approximately at 18:1.

Figure 11:
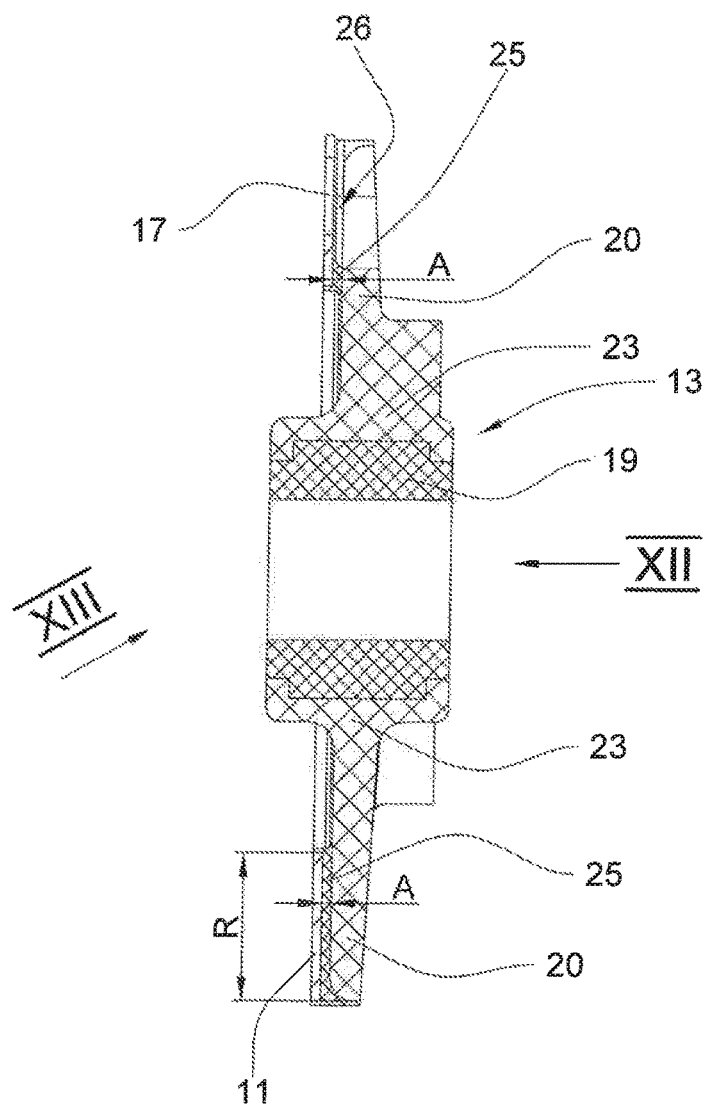
Figure 12:
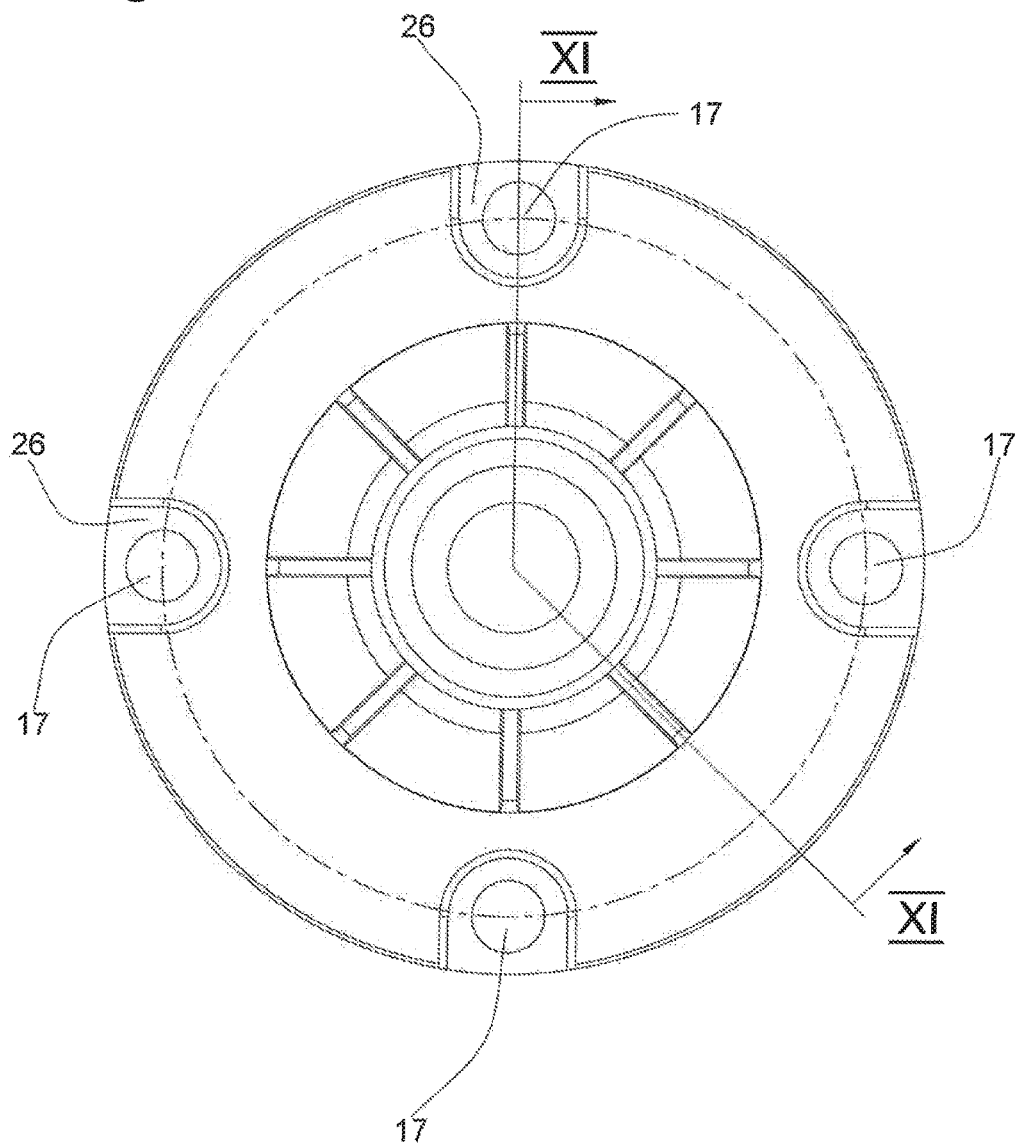
Figure 13:
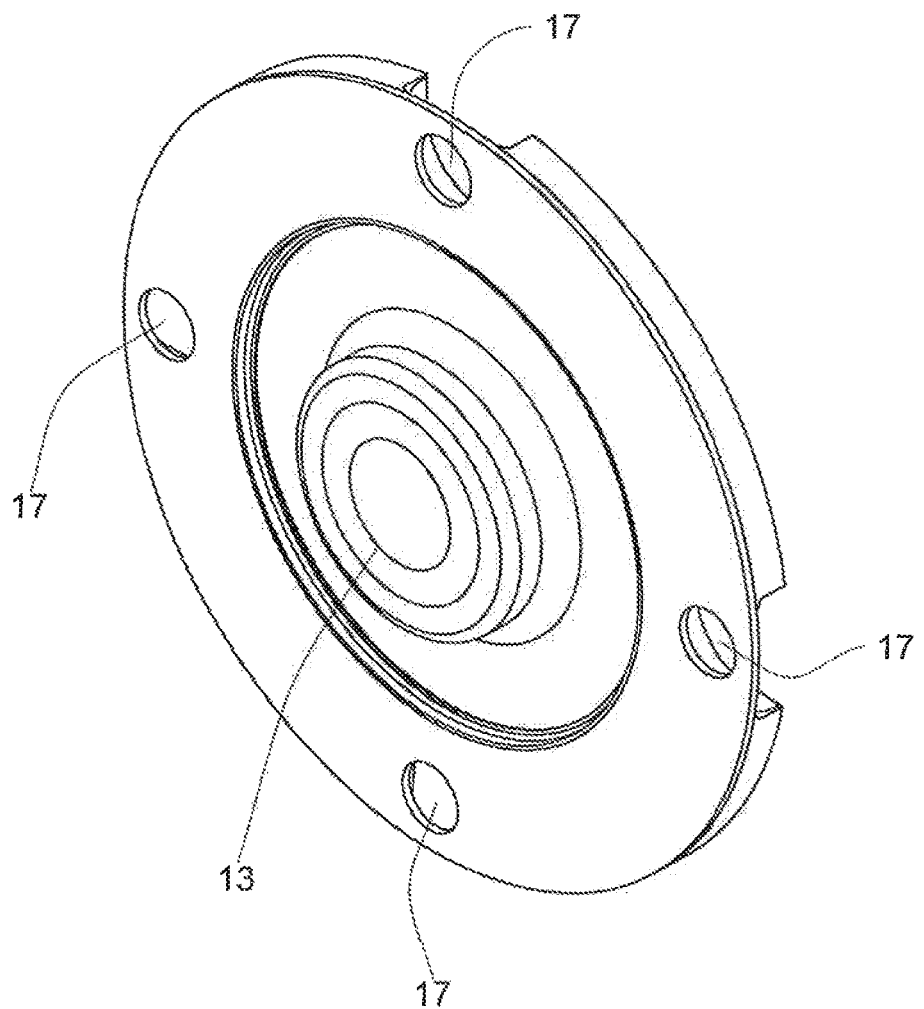

Whilst the embodiments of FIG. 7 and of FIGS. 11 to 13 are indeed different, these two embodiments have in common, however, that here respectively elastic elements 25 are provided, which have marginal recesses 26. Hereby, a particularly simple fastening possibility and positioning of fastening openings 27 or respectively 17 can be created. In the embodiment of FIGS. 11 to 13, the fastening bores are provided radially externally. Here, also, a positioning of the elastic element 25 in radial direction is provided relatively far externally, wherein here hub flange 20 and ring flange 11 have approximately the same external diameter. In the embodiment of FIG. 7, additional radially interior fastening bores 27 are provided.

With the aid of the following considerations, the aspect of the provision of a modular system according to the invention and of a production method for a coupling according to the invention is now also to be explained:

First, the second connection 13, i.e. the hub, e.g. according to FIG. 5, is placed into a tool mold, which is not illustrated. It is immaterial here for the invention whether the hub 13 is formed homogeneously from a high-strength plastic, or from metal. In a processing step preceding the production of the coupling according to the invention, a high-strength inner hub part or hub center 19 of metal or of high-strength plastic can also have been provided, which is encompassed by a surrounding injection for the provision of hub flange 13 and injection covering 23.

It is essential for the application of the method according to the invention that the second connection 13 provides a one-piece component, which has a vulcanization surface 24, and is constructed substantially in a single piece. This component 13 is placed into a tool mold.

Furthermore, the first connection 11, in particular a ring flange, is placed into the same tool mold. The tool mold has positioning surfaces for this, which ensure that after the insertion of the hub and of the ring flange into the tool, a space substantially in the shape of a circular ring disk remains, which spaces the two connections 11, 13 from one another. The receiving space in the shape of a circular ring disk can be constructed so as to be continuous, i.e. uninterrupted, here, or so as to be interrupted. It can also have recesses.

The tool is then closed, and a fluid, rubber-elastic material is introduced into the receiving space. In alternative variants of the production method according to the invention, first the rubber-elastic material is introduced in fluid form and thereafter the tool is closed. The penetration of the rubber-elastic material can also take place under pressure, so that one can speak in terms of an injecting.

After the introduction of the fluid rubber-elastic material into the receiving space shaped in the form of a circular ring disk, the material can harden. In the course of the hardening process, the rubber-elastic material vulcanizes, with the formation of a rubber-elastic element 25 on the vulcanization surfaces.

The tool can subsequently be opened and the coupling unit that is thus formed can be removed from the tool. The coupling is complete on demolding, i.e. no further processing steps on the coupling are necessary.

The production method according to the invention makes possible the use of the same tool for the construction and production of different couplings with, for example, differently dimensioned ring flanges 11.

Thus, for example, always the same hub part 13 can be inserted into the tool mold. However, ring flanges 11 of differing size, i.e. differently dimensioned, can be used. For example, a first ring flange 11 with a large external diameter can be provided for the provision of a first coupling size, and a second ring flange 11 with the same internal diameter having an external diameter that has been altered compared thereto can be provided. It is essential that the overlap region or coverage region of the two vulcanization surfaces 18, 24 is identical in the different coupling sizes. Hereby, a modular system is provided for the production of couplings that are torsionally rigid but permit radial offset, which permits a particularly simple possibility for the production of couplings of different overall sizes.

FIG. 5*a* presents a coupling flange of a ring flange 11*a*, which has a greater external diameter, but is otherwise constructed identically to the ring flange 11 of FIG. 5. It becomes readily clear that the ring flange 11*a* in a coupling according to FIG. 1 can replace the ring flange designated there by 11. For the production of such a coupling with a larger, altered ring flange 11*a* compared thereto, the same tool can be used as for the production of a coupling according to FIG. 5.

The invention claimed is:

1. A device for transmitting torque on an axis from a drive to an output, the device comprising:
   a first connection for connecting with the drive and having a vulcanization surface,
   a second connection for connecting with the output and also having a vulcanization surface, and
   an elastic element formed of rubber-elastic material in the power transmission path between the two connections, constructed so as to be radially soft, permitting an offset radially of the axis of up to 1 mm between the first connection and the second connection, torsionally rigid to permit an only very small torsion angle of at most 1.5° between the first connection and the second connection, and vulcanized to the vulcanization surface of the first connection and to the vulcanization surface of the second connection.

2. The device according to claim 1, wherein the first connection is a ring flange that has a plurality of angularly distributed fastening bores.

3. The device according to claim 2, wherein the ring flange consists of metal or of plastic.

4. The device according to claim 1, wherein the second connection is formed by a hub comprising a hub part of plastic or of metal.

5. The device according to claim 4, wherein the hub has internal teeth for achieving an insertable connection with a shaft.

6. The device according to claim 4, wherein the hub part, as a component of the hub, is injected onto the latter.

7. The device according to claim 1, wherein the vulcanization surfaces are on respective substantially radial planes and are at least substantially parallel to one another.

8. The device according to claim 1, wherein the elastic element is circularly annular.

9. The device according to claim 8, wherein the elastic element is angularly continuous.

10. The device according to claim 8, wherein the elastic element, deviating from a configuration in the form of a circular ring disk, has recesses.

11. The device according to claim 1, wherein the elastic element is angularly discontinuous.

12. The device according to claim 1, wherein the elastic element has a radial dimension and an axial dimension, the radial dimension being more than twice as great as the axial dimension.

13. The device according to claim 12, wherein a ratio of the radial dimension to the axial dimension is between 5:1 and 100:1.

14. The device according to claim 1, wherein the first connection is secured to the drive and/or the second connection is secured to the output without play, without the arrangement of loose surfaces, and without intercalation of elastic elements.

15. A device for the transmission of torque from a drive to an output, the device comprising:
   a first connection for connecting with the drive,
   a second connection for connecting with the output, the device being constructed so as to be substantially torsionally rigid to permit only a very small torsion angle of at most 1.5° between the first and second connections, and
   an elastic and circular ring disk of rubber-elastic material in the power transmission path between the two connections and constructed in the manner of a rubber track and having a radial dimension more than twice as great as its axial dimension so as to permit an offset radially of the axis of up to 1 mm between the first and second connections while being torsionally rigid to permit an only very small torsion angle of at most 1.5° between the first and second connections.

16. A modular system for torsionally rigid couplings permitting offset radially of a rotation axis of the system, the system comprising:
   a first device with a first connection in the form of a ring flange with dimensions of a first type and with a second connection in the form of a first hub, wherein the device is constructed so as to be substantially torsionally rigid to permit only a very small torsion angle of at most 1.5° between the first and second connections and radially soft to permit a radial offset to of up to 1 mm relative to the axis, there is in the power transmission path between the two connections an elastic element formed as a rubber track with a radial dimension more than twice as great as its axial dimension, and
   a second device with a first connection in the form of a ring flange with dimensions of a second type, differing from the dimensions of the first type, and with a second connection in the form of a second hub the same dimensions as the first hub, the second device has between the respective first and second connections an elastic element that is substantially torsionally rigid and radially soft like the first connection and formed as a rubber track with a radial dimension more than twice as great as its axial dimension.

* * * * *